358-69. OR 3,548,082 SR

T 6532

[11] 3,548,082

[72] Inventor Bernardus Henricus Josef Cornelissen
Emmasingel, Eindhoven, Netherlands

[21] Appl. No. 672,144
[22] Filed Oct. 2, 1967
[45] Patented Dec. 15, 1970
[73] Assignee U.S. Philips Corporation
New York, N.Y.
a corporation of Delaware. by mesne assignment
[32] Priority Oct. 1, 1966
[33] Netherlands
[31] No. 6613898

[54] COLOUR TELEVISION RECEIVER
6 Claims, 3 Drawing Figs.

[52] U.S. Cl. .......... 178/5.4
[51] Int. Cl. .......... H04n 9/24
[50] Field of Search .......... 178/5.4, 5.4F, 5.4H

[56] References Cited
UNITED STATES PATENTS

| | | | |
|---|---|---|---|
| 2,837,687 | 6/1958 | Thompson et al. | 178/5.4(F) |
| 2,848,531 | 8/1958 | Creamer et al. | 178/5.4(F) |
| 2,921,119 | 1/1960 | Schwartz | 178/5.4(F) |
| RE25,592 | 6/1964 | Moulton | 178/5.4(F) |
| 3,372,232 | 3/1965 | Shimada | 178/5.4(F) |

*Primary Examiner*—Robert L. Griffin
*Assistant Examiner*—Richard P. Lange
*Attorney*—Frank R. Trifari

ABSTRACT: A color television receiver of the type employing an indexing display tube. The indexing signal derived from the display tube is modified in a converter to form a writing signal on which the color signal is modulated. The indexing signals are applied to the converter by a first path and by a second phase compensation path. The second path includes at least two parallel branches, and one of the branches includes a frequency divider.

Figures 1, 2:
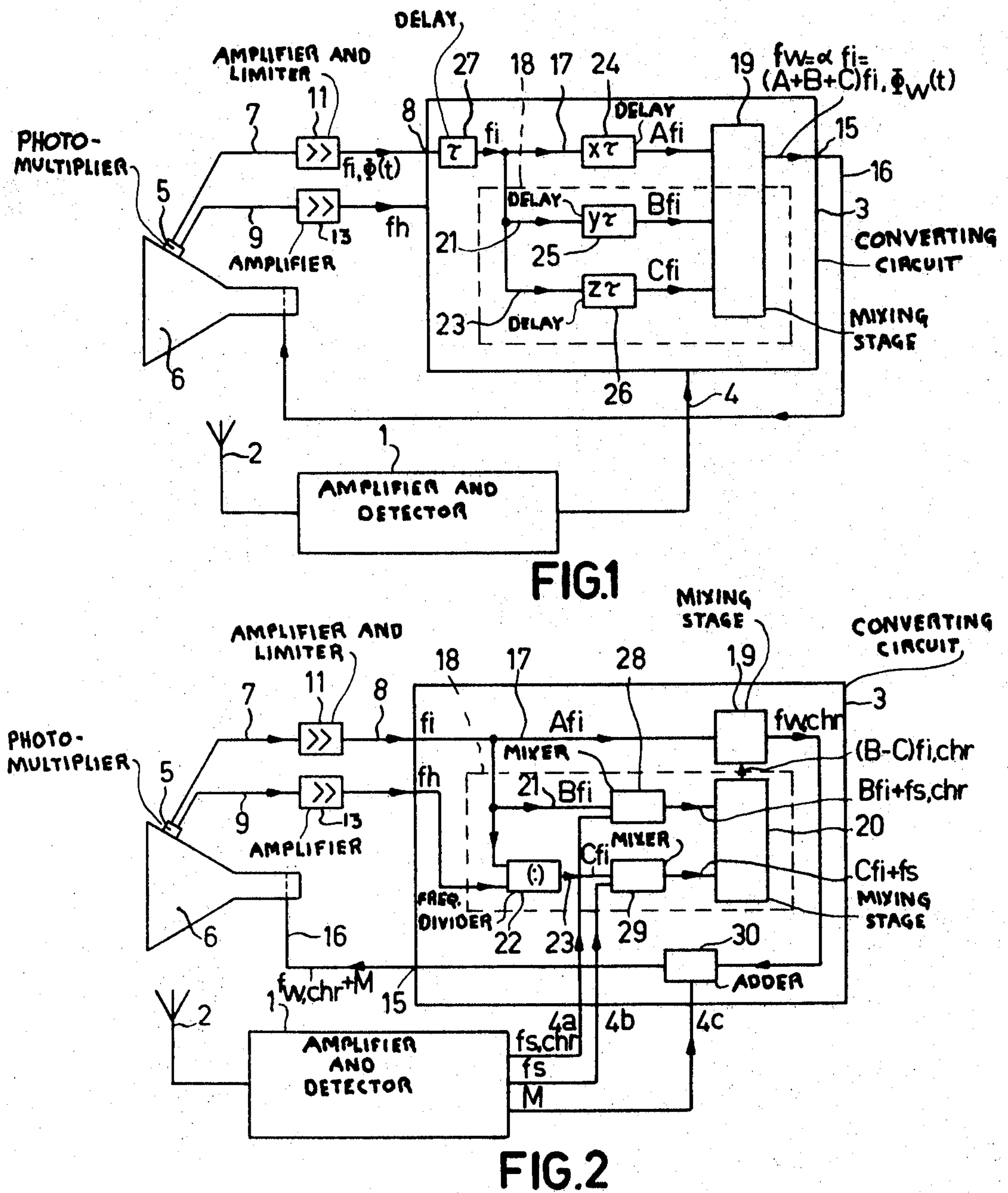

INVENTOR.
BERNARDUS H. J. CORNELISSEN

BY

Frank R. Trifari
AGENT

INVENTOR.
BERNARDUS H.J. CORNELISSEN

BY

Frank R. Trifari
AGENT

COLOUR TELEVISION RECEIVER

The invention relates to a colour television receiver comprising a cathode-ray display tube having groups of color strips and indexing strips (index tube), which indexing strips produce a signal when scanning by the electron beam, from which signal an indexing signal having a frequency $f_i$ is derived, the receiver comprising a converting circuit for converting the indexing signal into the writing or video intensity signal of a frequency $f_w = \alpha f_i$, which is modulated by a colour signal in a manner suitable for being reproduced by this index tube, said converting circuit comprising a first mixing circuit, a first signal path for transmitting the index signal to the first mixing stage, a second signal path (phase compensation circuit) for deriving from the index signal a phase compensation signal and for supplying this to the first mixing stage, said second signal path containing a frequency divider.

From French Pat. No. 1,336,421, converting circuits for use in colour television receivers of the kind set forth are known. These circuits serve for converting a colour signal received in the receiver in a video signal which is suitable for being reproduced by an index tube. A first requirement to be fulfilled is that the indexing signal for controlling the indexing tube should have such a frequency that the time period thereof corresponds to the time required by the writing electron beam of the index tube for travelling from a colour strip of a given group to the same colour strip of the next following group. This is achieved by causing the indexing strips to produce a signal the frequency $f_i$ thereof being multiplied in the converting circuit by a factor $\alpha$, which represents the ratio between the number of groups of colour strips and the number of indexing strips. A further requirement is a correct phase of the writing signal which has to be maintained even with different scanning speeds of the electron beam (compensation of static phase error). When using two signal paths along which the signal derived from the index strips is applied to a mixing stage, in which the second signal path, termed phase compensation circuit, includes a frequency divider, it has been found to be possible to combine a correct multiplication factor with a correct phase of the writing signal at different scanning speeds of the electron beam. This circuit arrangement has, however, the disadvantage that during a variation of the scanning speed a phase error (dynamic phase error) occurs.

In the circuit arrangement the conversion of the colour signal may be a direct or an indirect one.

In the indirect conversion two colour difference signals, obtained after double detection in the receiver, each are modulated on a signal of the desired frequency and phase in a mixing stage of the converting circuit, these signals being joined so that a dot-sequential signal is obtained which is suitable for being applied to the single gun of the index tube. In the direct conversion a dot-sequential colour signal obtained in the receiver after single detection, and, as the case may be after correction and modulation on the subcarrier, is introduced into a mixing stage of the converting circuit, whereas to a further mixing stage in the converting circuit, the nonmodulated colour carrier is applied so that the frequency of the colour subcarrier disappears again from the converting circuit.

Especially the direct conversion involves the disadvantage that interference signals are caused by the dividing and mixing processes in the converting circuit, said interference signals having frequencies that can be suppressed only by using selective filters. However, filters of high selectivity have long delay times so, that rapid action of the phase compensation is impeded. In order to avoid such filters said French patent specification provides a solution. There may be used, a push-pull mixing stages for the conversion in order to reduce the quantity of interference signals. However, these push-pull mixing stages are critical.

A further possibility referred to in French Pat. No. 1,345,289 consists in increasing the signal frequencies in the two signal paths by using frequency multiplication. The positions of the frequencies of the interference signals than are more favourable so that they can be suppressed by means of filters being more simple and having a comparatively large bandwidth. Part of the resultant reduction of the delay times, however, gets lost by a filtering required after the aforesaid frequency multiplication.

The invention has for its object to provide means for obviating the aforesaid disadvantages.

According to the invention a colour television receiver of the kind set forth is characterized in that the second signal path comprises at least two parallel branches, one of which includes the frequency divider.

It is thus possible to obtain the phase error compensation of a higher order or to achieve without the use of critical push-pull mixing stages to satisfactory filtering of the interference signals and short delay times. The choice of the delay times or of the signal frequencies in the parallel branches is very important and will be explained more fully with reference to the FIGS.

The invention will now be described more fully with reference to a few embodiments shown in the drawing.

In the drawing:

FIG. 1 shows a simplified block diagram of a colour television receiver according to the invention with phase compensation of higher order in the converting circuit.

FIG. 2 also shows a simplified block diagram of a colour television receiver comprising a converting circuit for direct conversion according to the invention.

Figure 3:
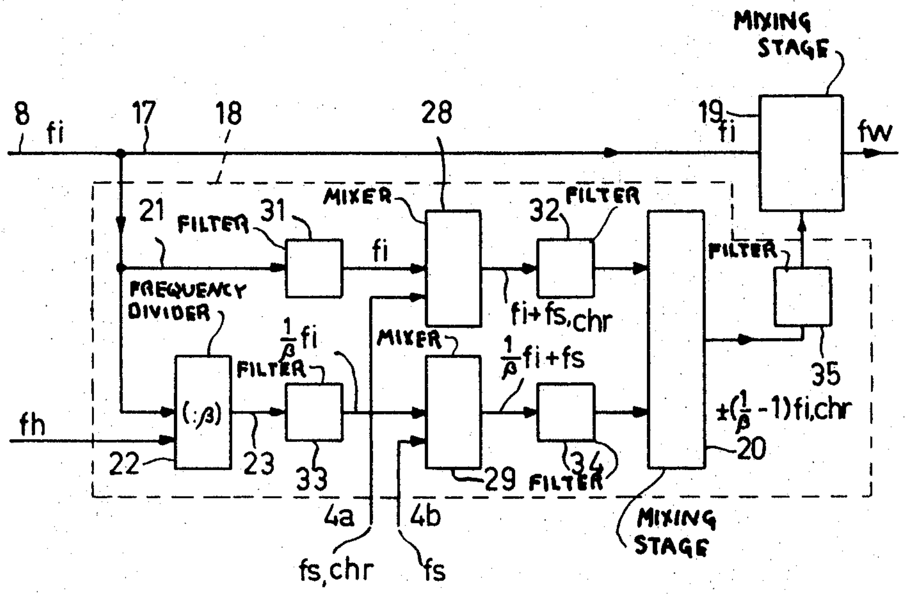

FIG. 3 shows a simple block diagram of the converting circuit of the receiver shown in FIG. 2 according to the invention.

Referring to FIG. 1, reference numeral 1 designates part of a colour television receiver in which a signal derived from an aerial 2 is amplified, detected and converted into a colour signal which is applied via a channel 4 to a converting circuit 3. The converting circuit 3 is connected to a signal producer 5, for example, a photomultiplier of a display tube of the indexing type 6 via two channels 7 and 9. The channel 7 serves for the supply of an indexing signal derived from the photomultiplier 5 and having a frequency of $f_i$ to an input 8 of the converting circuit 3 and includes an amplifier and a limiting circuit 11. Through the channel 9, which includes an amplifier 13, a running-in signal of the frequency $f_h$ is supplied to the converting circuit 3. The converting circuit 3 is connected by an output 15 through a channel 16 to a control electrode, for example the control grid, of the index tube 6. The converting circuit 3 comprises a first signal path 17 and a second signal path 18, which is also termed phase compensation circuit. Via the two signal paths 17 and 18, the indexing signal is applied to a mixing stage 19 of the converting circuit 3.

According to the invention, the second signal path 18 consists of two parallel branches 21 and 23. The signal path 17 and the parallel branches 21 and 23 have substantially constant delay times $x\,\tau$, $y\,\tau$ and $z\,\tau$, caused by filtering; they are indicated by symbols and designated by 24, 25 and 26 respectively. One of these parallel branches, for example 23, comprises a frequency divider which is not shown for the sake of clarity. The signal circuit from the output 15 of the converting circuit 3 via the channel 16, the index tube 6, the photomultiplier 5 and the channel 7 back to the input of the converting circuit 3 has a total delay time of $\tau$-seconds, which is indicated symbolically in the converting circuit 3 by 27. All functions not essential for the operation of the phase compensation of higher order, for example the processing of the colour signal from the channel 4 and of the running in-signal from the channel 9, are not indicated in the drawing for the sake of clarity.

The operation of the arrangement as far as it is essential for the invention, is as follows:- To the mixing stage 19, via the first signal path 17, is applied a signal having a frequency $Af_i$ which is derived from the indexing signal having a frequency $f_i$. The signal of the frequency $Af_i$ is delayed in the first signal path 17 with a delay time $x\,\tau$. To the mixing stage 19 is furthermore applied a signal having a frequency $(B + C)f_i$, which signal is obtained from signals having frequencies $Bf_i$ and $Cf_i$, which emanate via the parallel branches 21 and 23 from the indexing signal. These signals are delayed with delay times of $y\tau$ and $z\tau$ respectively. Owing to the various delays, the writing signal at the output 15 has a phase angle $\Phi_w(t)$. Owing to the mixing effect in the mixing stage 19 this writing signal has a frequency $f_w = (A + B + C)f_i = \alpha f_i$. The phase angle $\Phi_w(t)$ is composed of the phase angles $\Phi(t)$ of the signal prevailing at different instants at the input 8. For a better survey signals will be referred to hereinafter by their frequencies. For a satisfactorily transit time compensation the phase angle $\Phi_w(t)$ of the signal $\alpha f_i$ invariably has to be equal to $\alpha = (A + B + C)$ times the phase angle $\Phi(t)$ of the signal $f_i$ at the input 8. $\Phi_w(t)$ however, is equal to $A\,\Phi(t - a\tau) + B\Phi(t - b\tau) + C\,\Phi(t - c\tau)$, since $\Phi_w(t)$ is composed of the phase angles of the signal at the input 8 at the instants $(t - a\tau)$, $(t - b\tau)$ and $(t - c\tau)$, wherein $a = 1 + x$, $b = 1 + y$, $c = 1 + z$.

By developing each of the terms in Taylor series, analyses of $\Phi_w(t)$ gives:

$$\begin{aligned}\phi_w(t) &= A\left\{\phi(t) - \frac{a\tau}{1!}\phi'(t) + \frac{a^2\tau^2}{2!}\phi''(t) + \dots\right\} + \\ &+ B\left\{\phi(t) - \frac{b\tau}{1!}\phi'(t) + \frac{b^2\tau^2}{2!}\phi''(t) + \dots\right\} + \\ &+ C\left\{\phi(t) - \frac{c\tau}{1!}\phi'(t) + \frac{c^2\tau_2}{2!}\phi''(t) + \dots\right\} + \\ &= (A+B+C)\phi(t) - \frac{aA+bB+cC}{1!}\tau\phi'(t) \\ &\quad + \frac{a^2A+b^2B+c^2C}{2!}\tau^2\phi''(t) + \end{aligned}$$

wherein $(A+B+C)\Phi(t)$ represents the desired value and the other terms represent the phase errors of different orders. In order to obtain phase compensation of the first order, $aA + bB + cC$ has to be equal to zero. For a phase compensation of the second order also $a^2A + b^2B\ ^2B + c^2C$ has to be equal to zero and so on.

A further analysis of the error terms:

$$\frac{aA+bB+cC}{1}\tau\phi'(t),\ \frac{a^2A+b^2B+c^2C}{2'}\tau^2\phi''(t)\ \dots$$

shows that with a correct choice of $a$, $b$, $c$, A, B and C two error terms for each value of $\Phi'(t)$ and $\Phi''(t)$ can be made zero with the two parallel branches shown. When use is made of more parallel branches in the phase compensation circuit 18, more error terms can be made zero.

A compensation of an error of the first order means a compensation of static phase errors. A compensation of an error of the second order is a compensation of dynamic phase errors, but only in the case of linear variations. A compensation of an error of the third order is also a compensation of dynamic phase errors, however for quadratic variations.

It applies, in general, to a satisfactory transit time compensation that:

$A+B+C+\dots=\alpha=$ratio write frequency (/) index frequency.
$aA+bB+cC$ ________________________________ $=0$.
$a^2A+b^2B+c^2C+\dots=0$.
and so on.

From the condition $aA + bB + cC = 0$ it appears that since $a$, $b$ and $c$ are all positive, at least one of the values A, B or C, has to be negative, which means that when mixed in the mixing stage 19 one frequency has to be subtracted from the other.

A few examples of values for the various magnitudes, are:

(a) $\alpha=A+B+C=2/3$.
A=2; a=1; x=0.
B=−2; b=2; y=1.
C=2/3; c=3; z=2.

The values A, B and C exhibit a common factor 2 so that preferably first a frequency doubling is carried out prior to the division into the different signal paths of the converting circuit. Then the first signal path 17 of the first parallel branch 21 of the second signal path 18 need not produce a changing of the frequency and the frequency divider in the second parallel branch 23 of the second signal path 18 has to divide by a factor 3/2.

(b) $\alpha=A+B+C=2/3$.
$A=1$; $a=1$; $x=0$.
$B=-1$; $b=5$; $y=4$.
$C=2/3$; $c=6$; $z=5$.

It should be noted that with lower frequencies in the second signal path the delay times have to be long, whereas with higher frequencies the delay times have to be short. Short delay times are favourable to the quality of the picture obtainable by means of a colour television receiver having such a converting circuit.

The mixing stage 19 is shown in the FIG. as a single unit, but for example, in order to permit effective filtering of undesirable frequencies it may be composed of a plurality of stages. The signals $Bf_i$ and $Cf_i$ may then be mixed first in a separate mixing stage and then be filtered, after which they are mixed with the signal $Af_i$.

In this circuit the colour signals from the channel 4 may, of course, be converted directly or indirectly in the write signal.

Apart from the possibility of phase compensation of higher order the use of two parallel branches of different frequencies in the phase compensation circuit 18 provides the possibility to choose the frequency in these parallel branches so that only third or higher harmonics of the desired frequencies need to be filtered out. This means that filters having a wide pass band and hence a short delay time may be used, so that the arrangement is stable. This may be explained with reference to FIGS. 2 and 3.

Referring to FIG. 2, in which corresponding parts are designated by the same reference numerals as in FIG. 1, reference numeral 1 designates parts of a colour television receiver in which the signal from an areal 2 is amplified, detected and converted into an dot-sequential colour signal of the colour subcarrier frequency $f_{s,chr}$, the colour subcarrier $f_s$ and a composite brightness or monochrome signal M which signals are applied via the channels 4*a*, 4*b* and 4*c*, respectively to the converting circuit. The converting circuit 3 comprises a first signal path 17, a second signal path 18 having a first parallel branch 21, a second parallel branch 23 and a second mixing stage 20, and a first mixing stage 19, which receives via the first signal path 17 and the second signal path 18 signals derived from the index signal $f_i$. The first parallel branch 21 includes a third mixing stage 28, in which a signal of the frequency $Bf_i$ derive from a signal of the input 8 is mixed with the modulated colour subcarrier signal $f_{s,chr}$ supplied via the channel 4*a* to obtain a signal $Bf_i + f_{s,chr}$. The second parallel branch 23 comprises a frequency divider 22 which converts a signal from the input 8 into a signal of the frequency $Cf_i$, and a fourth mixing stage 29, in which the signal $Cf_i$ is mixed with the colour subcarrier signal $f_s$, supplied via the channel 4*b*, to obtain a signal $Cf_i + f_s$. The frequency divider 22 receives not only the index signal $f_i$ but also a running-in signal $f_h$, so that the output signal of this frequency divider during the beginning of a time base stroke is brought into the correct phase.

The outputs of the two parallel branches 21 and 23 are connected to the inputs of the second mixing stage 20 in which the signals $Bf_i + f_{s,chr}$ and $Cf_s$ are mixed to obtain a dot-sequential colour signal $(C-B)\,f_{i,chr}$, from which the colour subcarrier frequency $f_s$ has disappeared. The dot-sequential colour signal $(C - B)f_{i,chr}$ from the mixing stage 20 is then mixed in the first mixing stage 19 with the signal $Af_i$ derived from the index signal to obtain a dot-sequential colour signal $f_{w,chr}$. It then applies: $Af_i - (B - C)f_i = (A - B + C)f_i = \alpha f_i = f_w$. It is apparent therefrom that B occurs with negative polarity. The signal $f_{w,chr}$ after the addition of the brightness signal M from the channel 4c in a circuit 30 is available as a writing signal $f_{w,chr}+$ M with the desired frequency $f_w$ at the output of the converting circuit 3. The fact that by the choice of the frequencies in the parallel branches 21 and 23 said circuit arrangement may be more advantageous with respect to bandwidth and delay time of the filters in the second signal path 18 than the arrangement hitherto used, will be explained with reference to a practical embodiment. This embodiment is illustrated in FIG. 3 which shows a detailed block diagram of the converting circuit 3.

In FIG. 3, corresponding elements are designated by the same reference numerals as in FIG. 2. For the general description of the arrangement, reference may therefore be made to FIG. 2. The circuit arrangement of FIG. 3 comprises a number of filters 31, 32, 33, 34 and 35 which mainly determine the transit time correction and hence the phase compensation. The delay times and therefore the bandwidths of these filters are important in this respect. The converting circuit serves in the first place for changing the frequency of the index signal $f_i$ at the input 8, which frequency is usually about 12 Mc/s into a writing signal $f_w$, having a frequency two-thirds times the index frequency i.e. about 8 Mc/s. This frequency of 8 Mc/s is obtained by subtracting from the 12 Mc/s index signal by mixing in the mixing stage 19 a 4 Mc/s compensation signal, the latter signal being formed in the second signal path 18. In the conventional converting circuits this signal path 18 is a single path, including a frequency divider dividing the frequency $f_i$ by 3 hence to 4 Mc/s.

The second function of the converting circuit consists in the modulation of the index signal with the signal containing the colour information, which was carried out in the conventional converting circuit with direct conversion by mixing into the second signal path a dot-sequential colour signal modulating a colour subcarrier. The frequency of the modulated colour subcarrier is usually about 4.5 Mc/s so that a signal of 4 Mc/s had to be mixed with 4.5 Mc/s to obtain 8.5 Mc/s after which the frequency was brought again to 4.5 Mc/s by mixing with a nonmodulated colour subcarrier of 4.5 Mc/s. Mixing of the signals of 4 and 4.5 Mc/s to obtain 8.5 Mc/s involved the difficulty that second harmonics of 8 and 9 Mc/s of these signals produced by the mixing process were lying too near the desired signal of 8.5 Mc/s so that they could not be filtered out. Only by using critically adjusted push-pull mixing stages suppressing second harmonics, this circuit arrangement could be employed. In a further conventional converting circuit this drawback is eliminated by first doubling the index frequency to obtain 24 Mc/s so that in the second signal path 18 is a frequency to of 16 Mc/s was available which did not give rise to difficulties when mixing the signal of 4 4.5 Mc/s thereto.

However, this circuit arrangement had the disadvantage that before the frequency doubler for obtaining the 24 Mc/s signal there had to be included a filter, of which the delay time had to be compensated. This meant an increase in overall delay time of the circuit arrangement so that at a variation of the indexing frequency the writing frequency could not be adapted rapidly, which was not conducive to the quality of the picture of the display tube 6. In the circuit arrangement shown in FIG. 3, according to the invention, the 4 Mc/s signal is obtained by mixing in a second mixing stage 20 a signal of a frequency of about 12 + 4.5 = 16.5 Mc/s, supplied via the first parallel branch 21, with a signal of a frequency of about 16 + 4.5 = 20.5 Mc/s, supplied via the second parallel branch 23. The frequency divider 22 has to divide the frequency of the index signal by a factor three-fourths to obtain 16 Mc/s. In the mixing stages 28 and 29 the colour subcarriers, modulated and unmodulated, are added to the index signal of 12 Mc/s and to the frequency-divided signal of 16 Mc/s and the frequencies of 12 and 16 Mc/s in branches 21 and 23 are brought to 16.5 and 20.5 Mc/s respectively. In the second mixing stage 20 these frequencies are subtracted one from the other so that a signal of 4 Mc/s modulated with a dot-sequential colour signal is obtained.

The function of the various filters will now described. The filter 31 in the first parallel branch 21 filters harmonics of the 12 Mc/s index signal and may have a large bandwidth. The filter 32 in the same branch has to suppress the undesirable products of the third mixing stage 28, the initial frequencies 12 and 4.5 Mc/s the second harmonics of 12 and 4.5 Mc/s that is to say 24 and 9 Mc/s and the image frequency 12 − 4.5 = 7.5 Mc/s in which case the bandwidth has not to meet severe requirements. The filters 31 and 32 therefore do not have long delay times. The filter 33 in the second parallel branch 23 serves to block the undesirable products of the frequency divider 22 having frequencies of 8, 12 and 24 Mc/s, whereas the filter 34 in the same branch has to block the undesirable products of the fourth mixing stage, these are the initial frequencies of 4.5 and 16 Mc/s, the second harmonics of 4.5 and 16 Mc/s; that is to say 9 and 32 Mc/s, and the image frequency of 16 − 4.5 = 11.5 Mc/s, none of which frequencies are in the proximity of the pass-frequency of 20.5 Mc/s. Consequently this filter need not have a small bandwidth and therefore no long delay time. At the output of the second mixing stage 20, there is provided a filter 35 which has to pass the desired frequency of (20.5 − 16.5) = 4 Mc/s and has to suppress the undesirable frequencies such as the initial frequencies of 20.5 and 16.5 Mc/s, the second harmonics of 41 and 33 Mc/s and the image frequency of 36.5 Mc/s so that the bandwidth has to be very large and hence the delay time will be negligible. Therefore none of the said filters has a long delay time. The delay times in the circuit arrangement according to the invention due to the mixing stages and the filters for adding the colour signal in the compensation circuit moreover are in parallel instead of in series as in the conventional arrangement. Therefore without any trouble the available minimum delay time can be obtained in this compensation circuit. The first signal path 17 of the converting circuit does not include delaying elements so that the whole arrangement has a very advantageous phase stability which could not be obtained by the arrangements hitherto known.

A particularly stable embodiment of the circuit arrangement responding quickly to phase variations owing to the short delay times, is an embodiment in which the delay times in the fir times in the first and second parallel branches of the second signal path, are made equal to each other. From the considerations, given with reference to FIG. 1, it will be apparent, that no phase compensation of higher order is concerned here. Only the conditions $aA + bB + cC =$ and $A + B + C = ⅔$ are then fulfilled.

For this arrangement:

$A=1;\ x=0;\ a=1.$
$B=1;\ y=z;\ b=1+y=c.$
$C=-4/3;\ z=y;\ c=1+z=b.$
$aA+bB+cC=0.$
$1+b-4/3b=0;\ b=3;\ y=z=2.$

The delay times in the first and second parallel branches 21 and 23 have then to be $2\tau$, in which $\tau$ is the delay time of the feedback path from the output to the input of the converting circuit. A very short delay time of the filter 35 is neglected in this case. The conditions found, appear to be easily fulfilled with the required bandwidths of the filters.

As an alternative, the frequency of the output of the divider 22 and hence in the second parallel branch 23 may be rendered equal to 8 Mc/s and those in the first single path 17 and in the first parallel branch 21 of the second path 18 may be rendered equal to 12 Mc/s each.

A fundamental diagram of FIG. 1 for the delay time and the frequency multiplication factor are:

$A=1;\ a=1;\ x=0.$
$B=-1;\ b=c;\ y=z.$
$C=2/3;\ c=b;\ z=y.$

The conditions for the phase compensation of the first order is then $aA+bB+cC=0$
$1-b+2/3\ b=0$
$ab=3,\ c=3$ The available delay times of the filters in the parallel branches appear to be also $2\tau$ in this case. This can be easily satisfied since the requirements for the filters are not too severe. The filter 31 has to cut off the harmonics of 12 Mc/s, the filter 32 has to pass 16.5 Mc/s and to suppress the mixed frequencies of 12 and 4.5 Mc/s, the harmonics of 24 an and 9 Mc/s and the image frequency of 7.5 Mc/s. The filter 33 has to pass 8 Mc/s and has to suppress the second harmonic of 16 Mc/s thereof. The filter 34 has to pass 12.5 Mc/s and to cut off the mixed frequencies of 4.5 and 8 Mc/s, the second harmonics of 9 and 16 Mc/s thereof and the image frequency of 3.5 Mc/s.

Obviously for a higher indexing frequency, for example 15 Mc/s, and a writing frequency of 10 Mc/s, the requirements for the filters are substantially the same. Only with a lower colour subcarrier frequency the bandwidths of the filters 32 and 34 after the mixing stages 28 and 29 have to be narrower, but with the conventional values of the colour subcarrier frequency this is not the case so that the arrangement provides more favourable results than the conventional arrangements.

Although in this embodiment the mixing stages 28 and 29, in which the colour signal and the subcarrier are added, are each included in a different parallel branch, they may be arranged in one parallel branch. The available delay time of $2\tau$ in each of the parallel branches permits of doing so. It is furthermore very well possible to interchange the functions of the mixing stages 28 and 29 so that the mixing stage 29 receives the colour signal and the mixing stage 28 the subcarrier.

I claim:

1. A circuit for generating an intensity signal for a cathode ray display tube which generates a scanning index signal; said circuit comprising means for detecting said index signal; first means for mixing including two inputs and one output; first and second signal paths; said first path coupling said detecting means to said first input of said mixing means means; said second path coupling said detecting means to said second input and including two parallel coupled branches; means connected in said first branch for phase compensation of the intensity signal and means connected in sail second branch for dividing the frequency of an applied signal.

2. A circuit as claimed in claim 1 further comprising a second means for mixing having two inputs coupled to said parallel branches respectively and one output coupled to said second input of said first mixing means.

3. A circuit s as claimed in claim 2 further comprising third and fourth means for mixing coupled in said first and second parallel branches respectively, and means for applying to said third and fourth mixing means a colour subcarrier signal modulated by a colour signal and not modulated by a colour signal respectively, whereby the frequency of the colour subcarrier is suppresses suppressed in said first and second branches.

4. A circuit as claimed in claim 3 further comprising first and second means for delaying signals in said first and second branches respectively, the delay times being equal for said branches.

5. A circuit as claimed in claim 3 wherein the frequency of the signal applied to said third mixing means is of the same frequency as said index signal, and said dividing means divides by a ratio of 3:2, said divided signal being applied to said fourth mixing means.

6. A circuit as claimed in claim 5 wherein said first delaying means comprises first and second filters coupled to an input and the output of said third mixer respectively and said second delaying means comprises third and fourth filters coupled to an input and the output of said fourth mixing means respectively.